United States Patent
Yu et al.

(10) Patent No.: US 10,148,977 B2
(45) Date of Patent: Dec. 4, 2018

(54) ADVANCED CODING TECHNIQUES FOR HIGH EFFICIENCY VIDEO CODING (HEVC) SCREEN CONTENT CODING (SCC) EXTENSIONS

(71) Applicant: Futurewei Technologies, Inc., Plano, TX (US)

(72) Inventors: Haoping Yu, Carmel, IN (US); Meng Xu, Santa Clara, CA (US); Wei Wang, San Jose, CA (US); Fanyi Duanmu, Brooklyn, NY (US); Shervin Minaee, Brooklyn, NY (US)

(73) Assignee: Futurewei Technologies, Inc., Plano, TX (US)

( * ) Notice: Subject to any disclaimer, the term of this patent is extended or adjusted under 35 U.S.C. 154(b) by 206 days.

(21) Appl. No.: 15/178,316

(22) Filed: Jun. 9, 2016

(65) Prior Publication Data
US 2016/0373756 A1   Dec. 22, 2016

Related U.S. Application Data

(60) Provisional application No. 62/180,446, filed on Jun. 16, 2015.

(51) Int. Cl.
*H04N 19/513*   (2014.01)
*H04N 19/176*   (2014.01)
(Continued)

(52) U.S. Cl.
CPC ......... *H04N 19/513* (2014.11); *H04N 19/119* (2014.11); *H04N 19/176* (2014.11); *H04N 19/96* (2014.11)

(58) Field of Classification Search
CPC .. H04N 19/513; H04N 19/119; H04N 19/176; H04N 19/96; H04N 19/13; H04N 19/129; H04N 19/186; H04N 19/70
See application file for complete search history.

(56) References Cited

U.S. PATENT DOCUMENTS 8,995,523 B2   3/2015 Chien et al.
2013/0128982 A1*  5/2013 Kim ............ H04N 19/52
                                         375/240.16
(Continued)

FOREIGN PATENT DOCUMENTS

CN   102523367 A   6/2012
CN   104301737 A   1/2015
(Continued)

OTHER PUBLICATIONS

Joshi, R., et al., "High Efficiency Video Coding (HEVC) Screen Content Coding: Draft 3," JCTVC-T1005, Joint Collaborative Team on Video Coding (JCT-VC) of ITU-T SG 16 WP 3 and ISO/IEC JTC1/SC 29/WG 11, Feb. 10-17, 2015, 567 pages.
(Continued)

*Primary Examiner* — Anner N Holder
(74) *Attorney, Agent, or Firm* — Conley Rose, P.C.

(57) ABSTRACT

An encoding apparatus, decoding apparatus, and coding methods are provided. A method of decoding including receiving, by a decoder, a bitstream from an encoder, scanning, using the decoder, the bitstream to identify a first flag corresponding to a string of index values in a block other than a last string and a second flag corresponding to the last string of index values from the block, determining, by the decoder, that a context model used to encode the first flag is the same as the context model used to encode the second flag, and generating, by the decoder, a video frame using the context model.

18 Claims, 8 Drawing Sheets

(51) Int. Cl.
*H04N 19/119* (2014.01)
*H04N 19/96* (2014.01)

(56) References Cited

U.S. PATENT DOCUMENTS

| | | | |
|---|---|---|---|
| 2015/0030066 A1* | 1/2015 | Xu | H04N 19/463 375/240.02 |
| 2015/0146976 A1 | 5/2015 | Ma et al. | |
| 2015/0381994 A1 | 12/2015 | Yu et al. | |
| 2016/0227217 A1* | 8/2016 | Karczewicz | H04N 19/70 |

FOREIGN PATENT DOCUMENTS

| | | |
|---|---|---|
| WO | 2014205339 A2 | 12/2014 |
| WO | 2015054816 A1 | 4/2015 |

OTHER PUBLICATIONS

Foreign Communication From a Counterpart Application, PCT Application No. PCT/CN2016/085857, International Search Report dated Sep. 19, 2016, 7 pages.

Foreign Communication From a Counterpart Application, PCT Application No. PCT/CN2016/085857, Written Opinion dated Sep. 19, 2016, 4 pages.

Marpe, D., et al., "Context-Based Adaptive Binary Arithmetic Coding in the H.264/AVC Video Compression Standard," IEEE Transactions on Circuits and Systems for Video Technology, vol. 13, No. 7, Jul. 2003, pp. 620-636.

Xu, M., et al., "Non-CE1: Index Map Splitting (IMS) Mode for Palette Coding in HEVC SCC," Joint Collaborative Team on Video Coding (JCT-VC) of ITU-T SG 16 WP 3 and ISO/IEC JTC1/SC 29/WG11, JCTVC-U0149-r1, Jun. 19-26, 2015, 4 pages.

Joshi, R., et al., "High Efficiency Video Coding (HEVC) Screen Content Coding: Draft 6," Joint Collaborative Team on Video Coding (JCT-VC) of ITU-T SG 16 WP 3 and ISO/IEC JTC1/SC 29/WG 11, JCTVC-W1005v3, Feb. 19-26, 2016, 692.

Joshi, R., et al., "High Efficiency Video Coding (HEVC) Screen Content Coding: Draft 2," Joint Collaborative Team on Video Coding (JCT-VC) of ITU-T SG 16 WP 3 and ISO/IEC JTC 1/SC 29/WG 11, JCTVC-S1005, Jun. 30-Jul. 9, 2014, 374 pages.

Wang, W., et al., "Non-CE6: 2-D Index Map Coding of Palette Mode in HEVC SCC," Joint Collaborative Team on Video Coding (JCT-VC) of ITU-T SG 16 WP 3 and ISO/IEC JTC1/SC 29/WG 11, JCTVC-S0151, Oct. 17-24, 2014, 6 pages.

Ye, J., et al., "CE1-related: Palette Mode Context and Codeword Simplification," JCTVC-U0090, Jun. 19-26, 2015, 6 pages.

Kim, J., et aL, "CE1-related: simplification for index map coding in palette mode," JCTVC-T0078, Feb. 10-18, 2015, 6 pages.

Xu, M., et al., "Non-CE1: Context model unification for palette run type flags in HEVC SCC," JCTVC-U0148, Jun. 19-26, 2015, 4 pages.

Karczewicz, M., et al., "Non CE1: Grouping Palette Indices at Front," JCTVC-T0065r2, Feb. 10-18, 2015, 4 pages.

Kim, S., et al., "Non-SCCE3: High throughput palette coding," JCTVC-R0232, Jun. 30-Jul. 9, 2014, 8 pages.

Joshi, R., et al., "Screen content coding test model 4 (SCM 4)," JCTVC-T1014, Feb. 10-18, 2015, 12 pages.

Foreign Communication From a Counterpart Application, European Application No. 16811000.5, Partial supplementary European Search Report dated Apr. 24, 2018, 16 pages.

Marpe, D., et al., "Context-Based Adaptive Binary Arithmetic Coding in the H.264/AVC Video Compression Standard," IEEE Transactions on Circuits and Systems for Video Technology, vol. 13, No. 7, Jul. 2003, pp. 620-636.

Wang, W., et al., "Non-CE6: 2-D Index Map Coding of Palette Mode in HEVC SCC," JCTVC-S0151, Oct. 17-24, 2014, 4 pages.

Wang, W., et al., "Non-CE6: 2-D Index Map Coding of Palette Mode in HEVC SCC," JCTVC-S0151, Oct. 17-24, 2014, 6 pages.

Joshi, R., et al., "High Efficiency Video Coding (HEVC) Screen Content Coding: Draft 2," JCTVC-S1005, Jun. 30-Jul. 9, 2014, 374 pages.

Huawei USA R&D, "Non-CE6: 2-D Index Map Coding of Palette Mode in HEVC SCC," JCTVC-S0151, 11 pages.

* cited by examiner

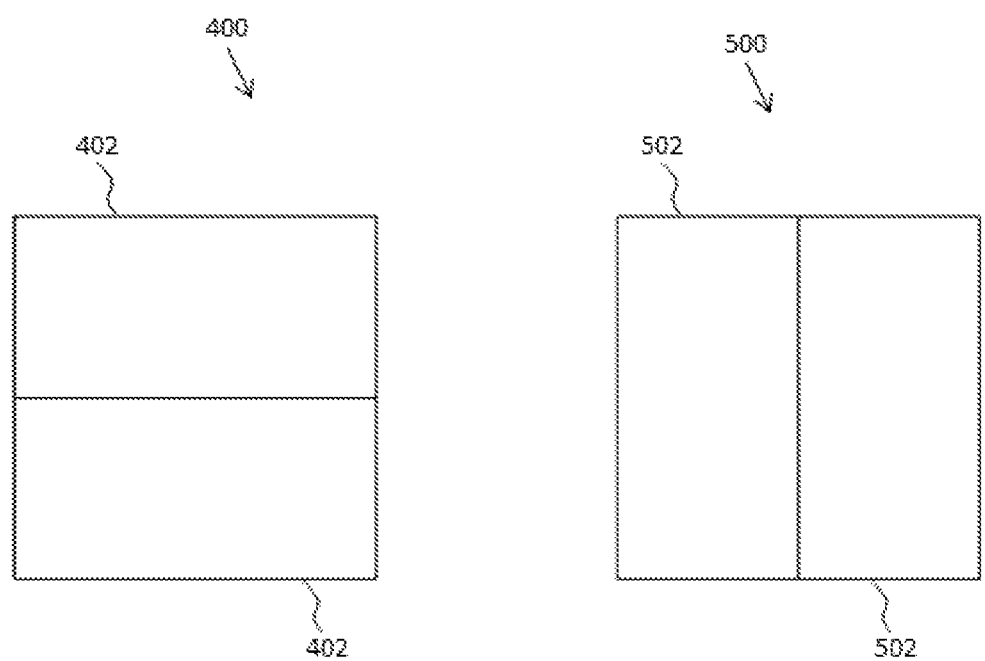

ADVANCED CODING TECHNIQUES FOR HIGH EFFICIENCY VIDEO CODING (HEVC) SCREEN CONTENT CODING (SCC) EXTENSIONS

CROSS-REFERENCE TO RELATED APPLICATIONS

The present application claims benefit of U.S. Provisional Patent Application No. 62/180,446 filed Jun. 16, 2015, by Haoping Yu, et al., and entitled, "Advanced Coding Techniques for HEVC SCC Extensions," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed prior to being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve image quality without increasing bit-rates are desirable.

SUMMARY

Despite the efficiency provided by the palette mode within the current High Efficiency Video Coding (HEVC) framework, there is still room for improvement. The disclosure provides multiple techniques that are designed to further improve the overall performance of HEVC Screen Content Coding (SCC) extensions, i.e., better coding efficiency and improved efficacy of parallel processing in encoding/decoding processes. In particular, improved prediction unit (PU) partition and block vector (BV)/Motion Vector (MV) prediction candidate selection for Inter block coding are discussed, where both the prediction block and the block under compression may come from the same frame (also known as Intra Block) or come from separate frames (also known as Inter frame prediction). Also discussed is advanced index map coding for the palette mode where each 2N×2N map is further partitioned into 4 N×N smaller maps using a quad-tree structure, or 2 2N×N or 2 N×2N sub-maps using the current PU partition design. As each sub-map may only consist of a subset of the indices in the complete map, an index conversion process is introduced to reduce the length of binary representation of the indices in the sub-maps. The benefits of coding smaller sub-maps include better coding efficiency and permitting parallel processing for coding of sub-maps. To further improve the coding efficiency, it is also proposed to extend the Above mode to the indices in the first row (in the horizontal scanning direction) or the left column (in the vertical scanning direction) for some of the sub-maps. In addition, it is proposed to use the same context for coding the RunType flag including the last run.

In one embodiment, the disclosure includes a method of decoding a video frame by receiving, by a decoder, a bitstream from an encoder, parsing, using the decoder, a first flag from the bitstream, wherein the first flag corresponds to a last string of index values in a block, parsing, using the decoder, a second flag from the bitstream, wherein the second flag corresponds to a string of values in the block other than the last string of index values in the block, wherein a context model used to parse the first flag is the same as the context model used to parse the second flag, and generating, by the decoder, the video frame using the first flag and the second flag.

In an embodiment, the first flag comprises a last_palette_run_type_flag. In an embodiment, the second flag comprises a palette_run_type_flag. In an embodiment, the context model comprises a context adaptive binary arithmetic coding (CABAC) context model. In an embodiment, the second flag comprises a palette_run_type_flag and the first flag comprises a last_palette_run_type_flag, and wherein the context model comprises a context adaptive binary arithmetic coding (CABAC) context model.

In another embodiment, the disclosure includes a method of encoding including decoding apparatus including a receiver configured to receive a bitstream from an encoder, the bitstream containing an index map, a processor operably coupled to the receiver and configured to decode the index map, wherein the index map includes a partition depth indicating a total number of partitions within the index map and a single index flag indicating a number of indexes for each sub-block within the index map, and a transmitter operably coupled to the processor and configured to transmit a video frame constructed using the partition depth and the single index flag.

In an embodiment, the index map comprises a square index map and the partitions comprise a quad-tree structure of square sub-blocks. In an embodiment, the index map comprises a square index map and the partitions comprise rectangular partitions. In an embodiment, the partition depth is not equal to zero when the single index flag is included in bitstream. In an embodiment, a single color table is shared among all of the sub-blocks. In an embodiment, a scanning direction for at least one of the sub-blocks is different from the scanning direction for another of the sub-blocks.

In yet another embodiment, the disclosure includes a decoding apparatus including a receiver configured to receive a bitstream from an encoder, the bitstream containing a vector prediction candidate list for a prediction unit of a first type, wherein vector candidates within the vector prediction candidate list are of a first type even though a neighbor prediction unit is of a second type, a processor operably coupled to the receiver and configured to select one of the vector candidates of the first type from the vector prediction candidate list, and a transmitter operably coupled to the processor and configured to transmit a video frame constructed using the one of the vector candidates selected from the vector prediction candidate list.

In an embodiment, the first type is an Intra Block Copy (IBC) and the second type is inter frame coding. In an embodiment, the first type is inter frame coding and the second type is an Intra Block Copy (IBC). In an embodiment, wherein the vector prediction candidate list includes at least one vector candidate of the first type that replaced at least one vector candidate of the second type. In an embodiment, the vector prediction candidate list comprises an Advanced Motion Vector Prediction (AMVP) list. In an embodiment, the vector prediction candidate list comprises an Advanced Block Vector Prediction (ABVP) list. In an embodiment, an order of the vector candidates of the first type in the vector prediction list has been changed in response to at least one of the vector candidates of the second type being eliminated. In an embodiment, a total number of the vector candidates of the first type in the vector prediction list has been changed when at least one of the vector candidates of the second type has been eliminated.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 4-5 are embodiments of an index map illustrating rectangular partitions.

DETAILED DESCRIPTION

Figure 1:
FIG. 1 is a diagram of index map colors in a block used to illustrate index map coding using a palette mode.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . or 255) that represents an image quality or characteristic, such as luminance or chrominance, at the corresponding reference point. In use, an image or video frame may comprise a large amount of pixels (e.g., 2,073,600 pixels in a 1920×1080 frame). Thus, it may be cumbersome and inefficient to encode and decode (referred to hereinafter simply as code) each pixel independently. To improve coding efficiency, a video frame is usually broken into a plurality of rectangular blocks or macroblocks, which may serve as basic units of processing such as prediction, transform, and quantization. For example, a typical N×N block may comprise $N^2$ pixels, where N is an integer greater than one and is often a multiple of four.

In the International Telecommunications Union (ITU) Telecommunications Standardization Sector (ITU-T) and the International Organization for Standardization (ISO)/International Electrotechnical Commission (IEC), new block concepts were introduced for High Efficiency Video Coding (HEVC). For example, coding unit (CU) may refer to a sub-partitioning of a video frame into rectangular blocks of equal or variable size. In HEVC, a CU may replace macroblock structure of previous standards. Depending on a mode of inter or intra prediction, a CU may comprise one or more prediction units (PUs), each of which may serve as a basic unit of prediction. For example, for intra prediction, an 8×8 CU may be symmetrically split into four 4×4 PUs. For another example, for an inter prediction, a 64×64 CU may be asymmetrically split into a 16×64 PU and a 48×64 PU. Similarly, a PU may comprise one or more transform units (TUs), each of which may serve as a basic unit for transform and/or quantization. For example, a 32×32 PU may be symmetrically split into four 16×16 TUs. Multiple TUs of one PU may share a same prediction mode, but may be transformed separately. Herein, the term block may generally refer to any of a macroblock, CU, PU, or TU.

Depending on the application, a block may be coded in either a lossless mode (e.g., no distortion or information loss) or a lossy mode (e.g., with distortion). In use, high quality videos (e.g., with YUV subsampling of 4:4:4) may be coded using a lossless mode, while low quality videos (e.g., with YUV subsampling of 4:2:0) may be coded using a lossy mode. As used herein, the Y component in YUV refers to the brightness of the color (the luminance or luma) while the U and V components refer to the color itself (the chroma). Sometimes, a single video frame or slice (e.g., with YUV subsampling of either 4:4:4 or 4:2:0) may employ both lossless and lossy modes to code a plurality of regions, which may be rectangular or irregular in shape. Each region may comprise a plurality of blocks. For example, a compound video may comprise a combination of different types of contents, such as text and computer graphic content (e.g., non-camera-captured images) and natural-view content (e.g., camera-captured video). In a compound frame, regions of texts and graphics may be coded in a lossless mode, while regions of natural-view content may be coded in a lossy mode. Lossless coding of texts and graphics may be desired in, for example, computer screen sharing applications, since lossy coding may lead to poor quality or fidelity of texts and graphics, which may cause eye fatigue.

With the rapid and continuous advancements made in semiconductors, networking, communications, displays, computers, and devices such as tablets and smart phones, many applications call for HEVC-based compression/coding solutions that can efficiently compress the non-camera-captured video content at high visual quality. This non-camera-captured video content, which may be referred to herein as screen content, may include computer generated graphics, text with typical motion commonly seen in applications such as window switching and moving, text scrolling, and the like. In many cases, the non-camera-captured video content provides clear textures and sharp edges with distinct colors at high contrast and may have a 4:4:4 color sampling format.

Current HEVC screen content coding introduces a palette mode to more efficiently represent computer screens. The palette mode is described in R. Joshi and J. Xu, Working Draft 2 of HEVC Screen Content Coding, MPEG-N14969/ JCTVC-51005, Strasbourg, FR, October 2014 (HEVC SCC), which is incorporated herein by this reference. Palette mode is adopted in the HEVC SCC Draft for efficiently representing and compressing computer-generated content. It is developed as an additional mode for intra coding. For every CU, the original pixel block is translated to the palette table and corresponding index map. The palette mode is also utilized in the Screen Content Coding Test Model (SCM) 2.0 reference software.

Despite the efficiency provided by the palette mode within the current HEVC framework, there is still room for improvement. Disclosed herein are systems and methods for improved video coding. The disclosure provides multiple techniques that are designed to further improve the overall performance of HEVC SCC extensions, i.e., better coding efficiency and improved efficacy of parallel processing in encoding/decoding processes. In particular, improved PU partition and block vector (BV)/Motion Vector (MV) prediction candidate selection for Inter block coding are discussed, where both the prediction block and the block under compression may come from the same frame (also known as Intra Block) or come from separate frames (also known as Inter frame prediction). Also discussed is advanced index map coding for the palette mode where each 2N×2N map is further partitioned into 4 N×N smaller maps using a quadtree structure, or 2 2N×N or 2 N×2N sub-maps using the current PU partition design. As each sub-map may only consist of a subset of the indices in the complete map, an index conversion process is introduced to reduce the length of binary representation of the indices in the sub-maps. The benefits of coding smaller sub-maps include better coding efficiency and permitting parallel processing for coding of sub-maps. To further improve the coding efficiency, it is also proposed to extend the Above mode to the indices in the first row (in the horizontal scanning direction) or the left column (in the vertical scanning direction) for some of the sub-maps. In addition, it is proposed to use the same context for coding the RunType flag including the last run. The details on these new techniques are described below along with the corresponding syntax changes.

In palette-based coding, which may be particularly suitable for screen generated content coding, a video coder (e.g., a video encoder or video decoder) forms a "palette" of colors representing the video data of a given block. The palette may include the most dominant (e.g., frequently used) colors in the given block. The colors that are infrequently or rarely represented in the video data of the given block are not included in the palette. The colors that are not included in the palette are referred to as escape colors.

When an index map corresponding to the given block is coded during palette mode coding, each of the colors included in the palette is assigned an index value. For example, if the colors black and white are included in the palette, the color white may have an index value of 0 and the color black may have an index value of 1. In addition, each of the colors not included in the palette are assigned, for example, a single or common index value. For example, if the colors blue, green, and red are not included in the palette, these colors will all have an index value of 3. The index value for the colors not included in the palette may be referred to as an escape color index value.

The current HEVC SCC draft utilizes a run-based one-dimensional (1-D) string. Even so, two-dimensional (2-D) string methods have been proposed in W. Wang, Z. Ma, M. Xu, H. Yu, "Non-CE6: 2-D Index Map Coding of Palette Mode in HEVC SCC," JCTVC-S0151, Strasbourg, FR, October 2014, and U.S. Provisional Patent Application No. 62/060,450 entitled, "Palette Mode in HEVC SCC," filed October 2014, which are incorporated herein by this reference. While not fully described herein for the sake of brevity, those skilled in the art will appreciate that the 2-D string methods may default to a run based 1-D string method in some circumstances.

When index mode coding in palette mode using the 1-D string method, two main parts are involved for each CU. Those two parts are color table processing and index map coding. By way of example, the index map coding for the 1-D string method may utilize a _ABOVE mode, where _ABOVE_MODE is applied to indicate whether the current string is identical to the indices from the string directly above the current string.

FIG. 1 illustrates an 8×8 block 100 of index map colors that will be used to provide an example of index map coding using the palette mode. As shown, a top string 102 in the block 100 has the index values 1, 1, 1, 1, 2, 2, 2, and 2 (from left to right), the string 104 immediately below the top string 102 has the index values 1, 1, 1, 1, 1, 1, 1, and 1, the next string 106 in the block 100 has the index values 1, 1, 1, 1, 1, 1, 1, and 1, the next string 108 in the block 100 has the index values 1, 1, 3 (where the 3 represents blue), 2, 2, 2, 2 and 2, the next string 110 in the block 100 has the index values 1, 1, 3 (where the 3 represents green), 2, 2, 2, 2 and 2, the next string 112 in the block 100 has the index values 1, 1, 3 (where the 3 represents red), 2, 2, 2, 2 and 2, the next string 114 in the block 100 has the index values 2, 2, 2, 2, 2, 2, 2, and 2, and the bottom string 116 in the block 100 has the index values 2, 2, 2, 2, 2, 2, 2, and 2. To encode the first string 102 in a bitstream, a palette_run_type_flag (e.g., a one-bit palette_run_type_flag), an index value, and a run value are used.

The palette_run_type_flag indicates whether any index values in the string above the current string have been copied. If a portion of the string above has been copied, the palette_run_type_flag is set to a first binary number (e.g., 1) representing the ABOVE_MODE. If the string above has not been copied, the palette_run_type_flag is set to a second binary number (e.g., 0) representing the _INDEX_MODE. When encoding the top string 102, the palette_run_type_flag is set to 0 by default because there are no strings disposed above the top string 102. The index value is the particular number value (e.g., 1 or 2) represented within the string in the block 100. The run value is how many consecutive index values may be copied. For example, if the run value is set to 1, a single index value is copied, if the run value is set to 2, two consecutive index values are copied, if the run value is set to 3, three consecutive run values are copied, and so on. So, to encode the top string 102 having the index values 1, 1, 1, 1, 2, 2, 2, 2, the following syntax is used: palette_run_type_flag=0, index value=1, run value=4, palette_run_type_flag=0, index value=2, run value=4.

To encode the next string 104 having index values 1, 1, 1, 1, 1, 1, 1, 1, the following syntax may be used: palette_run_type_flag=1, run value=4, palette_run_type_flag=0, index value=1, run value=4. In the alternative, the following syntax may also be used: palette_run_type_flag=0, run value=8. To encode the next string 106 having index values 1, 1, 1, 1, 1, 1, 1, 1, the following syntax is used: palette_run_type_flag=1, run value=8. The particular syntax used for encoding may be determined by, for example, a rate-distortion optimization module or other suitable encoder component. The rate-distortion optimization module may select the particular syntax based on, for example, which syntax is most efficient to code. As an example, all the indices in string 104 and 106 may be encoded as palette_run_type_flag=0, index value=1, run=16.

The next string 108 has the index values 1, 1, 3, 3, 2, 2, 2, 2, where the 3 is an escape color index value corresponding to the escape color blue or the escape color green. Using the existing conventional coding scheme, the following syntax is used to encode next string 108: palette_run_type_flag=1, run value=2, palette_run_type_flag=0, index value=3, escape color=blue, palette_run_type_flag=0, index value=3, escape color=green, palette_run_type_flag=0, index value=2, run value=4. Likewise, using the existing conventional coding scheme, the following syntax is used to encode the next string 110: palette_run_type_flag=1, run value=2, palette_run_type_flag=0, index value=3, escape color=green, palette_run_type_flag=0, index value=3, escape color=blue, palette_run_type_flag=1, run value=4. The following syntax is used to encode the next string 112: palette_run_type_flag=1, run value=2, palette_run_type_flag=0, index value=3, escape color=red, palette_run_type_flag=1, run value=5.

Figure 2:
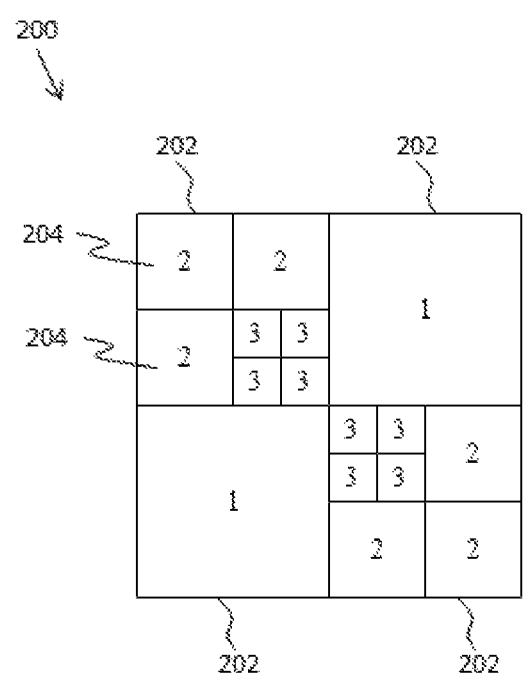
FIG. 2 is an embodiment of an index map illustrating partitions and depths for sub-blocks.

Keeping the above in mind, the index map 200 corresponding to the current CU can be coded using various partitions consisting of smaller blocks with different sizes as shown in FIG. 2. One possibility is to use a quad-tree structure for the index map, where the index map 200 in the form of a square block is split into four square sub-blocks 202. For a given sub-block 202, the number required to split from the original block is called the index map depth. As shown in FIG. 2, the index map 200 has a total depth of "3," which may be coded using a syntax element.

Coding the index map with a partition structure, a single color table is signaled and coded for the entire partition, and it is shared among all the sub-blocks. Basically, the encoder determines the partition for all sub-blocks. With an index map partition, some sub-blocks could be potentially coded more efficiently and therefore it improves the overall coding performance.

In each sub-block 202, when the partition depth is not equal to 0, a single_index_flag is signaled to indicate whether this sub-block contains only a single index. If single_index_flag is equal to 1, then an index is signaled and the remaining part of the index map coding is bypassed. In an embodiment, the total depth indicates the largest number of partitions used in the entire block (e.g., block 200) and the single_index_flag is used to indicate the depth of a particular sub-block (e.g., sub-block 202, 204). Using this coding strategy, the "copy above" functionality described herein may be used to promote coding efficiency. For example, when four of the number 3 are found in one sub-block, the bottom 3s can be "copied" from the above 3s during coding.

An illustrative example of the coding for index map 200 is provided for clarity. When the index map 200 is coded, a total depth of 3 is signaled. This total depth indicates the total number of partitions (e.g., quad-tree or binary structures) in the index map. After the total depth, the partition depth of the first sub-block encountered is signaled. The position of the first sub-block encountered will depend on the direction of coding. In FIG. 2, the top left sub-block 202 is used.

For the top left sub-block 202, an encoder signals a single_index_flag is 2 for the first three sub sub-blocks 204 and that the single_index_flag is 3 for the remaining sub sub block 204 as shown in FIG. 2. In an embodiment, the top two sub sub-blocks may be encoded with a value of 3, and the copy above functionality as described above may be employed to encode the bottom two sub sub-blocks also having a value of 3 to promote coding efficiency.

Because the total depth of the index map 200 was indicated as being 3 and 3s were signaled for the sub sub-block 204, an indication is provided to the encoder that no further partitions are found in the top left sub-block 202. Thus, the encoder moves on to the next sub-block to be encoded depending on the coding direction. For example, the top right sub-block 202 may be encoded next. For the top right sub-block 202, an encoder signals the single_index_flag as 1 such that the remaining part of the index map 200 for that sub-block 202 is bypassed. Likewise, for the bottom left sub-block 202, the encoder signals the single_index_flag as 1 such that the remaining part of the index map 200 for that sub-block 202 is bypassed.

For the bottom right sub-block 202, the encoder signals the single_index_flag is 3 for the first sub sub-block 204 and the single_index_flag is 2 for the remaining three sub sub-blocks 204 as shown in FIG. 2. Again, in an embodiment, the top two sub sub-blocks 204 may be encoded with a value of 3, and the copy above functionality described above may be employed to encode the bottom two sub sub-blocks 204 also having a value of 3 to promote coding efficiency. Upon receiving the bitstream encoded as noted above, the decoder may decode the bitstream in a similar manner.

Note that index map partitioning is independent of coding unit partitioning, and is also independent of the index map coding method. It applies regardless of which method is used for index map prediction and coding. For example, one sub-block can use a horizontal scan process while another can use a vertical scan process.

In an embodiment, an N×N index map partition and coding may be used. When the maximum allowed index map quad-tree depth is 1, the quad-tree can be coded using the PU structure under the HEVC framework. An index_part_mode flag is signaled to indicate whether the current index map is partitioned into smaller index maps. In one embodiment, index_part_mode can be coded in the same fashion as the PU splitting flag coded in HEVC Intra mode. In another embodiment, index_part_mode can be coded using a separate context model, or using the bypass mode.

A video coder may code each bin for a block of video data, whether corresponding to transform coefficients or syntax information for the block, using probability estimates for each bin. The probability estimates may indicate a likelihood of a bin having a given binary value (e.g., "0" or "1"). The probability estimates may be included within a probability model, also referred to as a "context model." A video coder may select a context model by determining a context for the bin. context for a bin of a syntax element may include values of related bins of previously coded neighboring syntax elements. In some examples, context for coding a current syntax element may include neighboring syntax elements positioned on the top and to the left of the current syntax element. In any case, a different probability model is defined for each context. After coding the bin, the context model is further updated based on a value of the bin to reflect the most current probability estimates.

In an embodiment, the context model is a probability model such as, for example, a context adaptive binary arithmetic coding (CABAC) context model. Context modeling provides estimates of conditional probabilities of coding symbols. Utilizing suitable context models, a given inter-symbol redundancy can be exploited by switching between different probability models according to already-coded symbols in the neighborhood of the current symbol to encode. Context modeling is responsible for most of CABAC's roughly 10% savings in bit rate over the context-adaptive variable-length coding (CAVLC) entropy coding method. Further discussion and examples of context modeling are found in D. Marpe, et. al, "Context-Based Adaptive Binary Arithmetic Coding in the H.264/AVC Video Compression Standard," IEEE Transactions On Circuits And Systems For Video Technology, Vol. 13, No. 7, July 2003, which is incorporated herein by reference.

Figure 3:
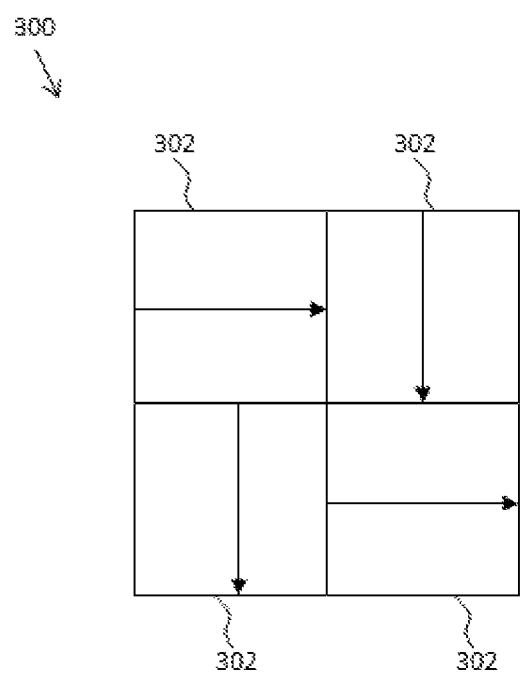
FIG. 3 is an embodiment of an index map illustrating scanning directions for sub-blocks.

When an N×N PU partition is used, the original index map is split into 4 smaller square index maps that share the same palette table. Each sub-block can be coded in a parallel fashion. The techniques used for coding the larger index maps can be applied on the smaller blocks as well. For example, each sub index map can be coded using adaptive scan direction (e.g., horizontal or vertical), along with the existing Index/Above mode, as illustrated in FIG. 3. The block 300 of FIG. 3 may be similar to the block 200 of FIG. 2. However, block 300 of FIG. 3 illustrates the scan direction for each sub-block 302 while block 200 of FIG. 2 illustrates the index map depth for each sub-block 202.

In an embodiment, a 2N×N and N×2N index map partition and coding may be used. A block 400 with a 2N×N index map partition is illustrated in FIG. 4, while a block 500 with a N×2N index map partition is illustrated in FIG. 5. The block 400 of FIG. 4 and the block 500 of FIG. 5 may be similar to the block 300 of FIG. 3. With a 2N×N or N×2N partition, the original index map is split into two smaller rectangular blocks 402, 502 that share the same palette table. When rectangular partitioning is enabled, the index_part_mode flag can be coded in the same fashion as the PU partition flag in the Inter mode.

In an embodiment, index refinement is used for a sub index map. A sub index map contains indices corresponding to only partial entries in the palette table. An index refining process is applied to convert the indices into new values that span on a smaller range, as collectively illustrated by the blocks 600 in FIGS. 6A and 6B. The blocks 600 of FIGS. 6A and 6B may be similar to portions of the block 100 of FIG. 1.

Figure 6A:
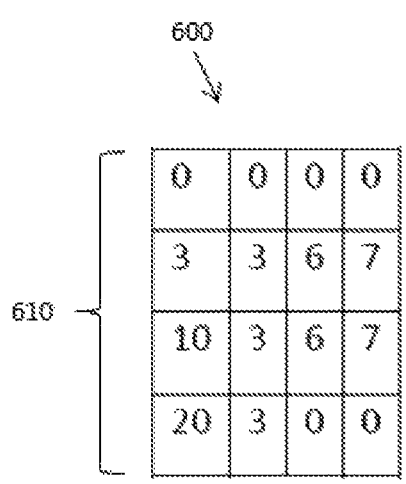
FIGS. 6A-6B are embodiments of blocks illustrating index refinement for a sub index map.

In an embodiment, the refining process is described in the following steps. In one step, the sub index map 610 in block 600 of FIG. 6A is scanned. All the existing distinct indices (e.g., 0, 3, 6, 7, 10, and 20) in the current sub index map 610 are found and sorted in ascending order. Next, integers 0, 1, 2, . . . n are assigned to the sorted indices, where n represents the number of unique indices in the current sub index map. In an embodiment, the integers are consecutively assigned.

A vector named index_refinement_vector containing binary bits equal to the size of the current color table (e.g., when palette_escape_val_present_flag is 0), or equal to current table size plus one (e.g., when palette_escape_val_present_flag is 1), is signaled to indicate which indices are present in the current sub index map. For each bit in the vector, 1 indicates the corresponding index is present in the current sub index map and 0 indicates the corresponding index is not present.

As an example, FIG. 6A illustrates a typical 4×4 sub index map 610, which is based on the assumption that the associated palette table size is 21 (i.e., the maximum index value is 20) and there are no escaped pixels. In this example, the maximum index value is 20. With Truncated Binary Coding (TBC), the binary representation of each index requires 4 or 5 bits for each index. The corresponding index_refinement_vector is 100100110010000000001.

Figure 6B:
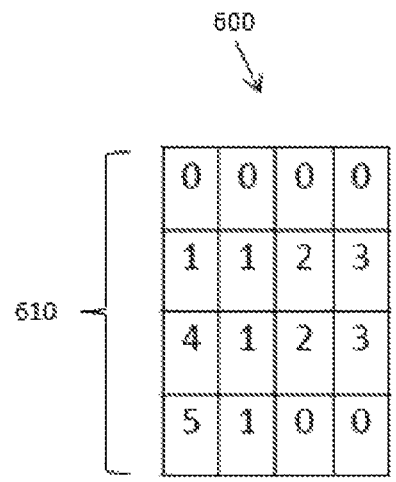

After index refinement, the sub index map 610 of FIG. 6A is simplified to the sub index map 610 depicted in FIG. 6B. Using the index refinement technique, the maximum index value after refinement becomes 5. The binary representation of each index requires only 2 or 3 bits for each index.

In an embodiment, the COPY_ABOVE_MODE may be extended among sub index maps. When an index map is split into smaller blocks as described above, the copy above technique in palette codes (PLT) coding is extended to include the first row/column of a sub index map, where index prediction can be applied between two neighboring sub index blocks. When a horizontal scanning direction is used, the first row of the bottom blocks can use the indices from the last row of its above neighbor blocks as prediction. When a vertical scanning direction is used, the left column of the right blocks can use the indices from the right column of its left blocks as prediction. The Extended copy above method is constrained within the current Coding Unit (CU). In other words, the top-left block cannot apply this method. However, the top-right block coded using the vertical scan direction can copy the indices from the right column of the top-left block, and the left-bottom block coded using the horizontal scan direction can copy the indices from the bottom row of the top-left block.

In the case that all of the indices in the current sub index map can be copied from its neighbor, then the syntax element num_palette_indices_idc is set to 0 and signaled in the bitstream, and the remaining part of the index map coding is skipped. When a sub index map contains only a single index, if the entire sub index map can be copied from the last line of its neighbor, it will be coded using the extended copy above mode. Otherwise, it will be coded using the index mode using PLT coding techniques in the HEVC SCC extension.

The syntax of using advanced index map coding in palette mode is illustrated in Table 1 and Table 2:

TABLE 1

Example of advanced index map coding

| palette_coding( x0, y0, nCbS ) { | Descriptor |
|---|---|
|   palettePredictionFinished = 0 | |
|   NumPredictedPaletteEntries = 0 | |
|   for( i = 0; i < PredictorPaletteSize && !palettePredictionFinished && | |
|     NumPredictedPaletteEntries < palette_max_size; i++ ) { | |
|     palette_predictor_run | ue(v) |
|     if( palette_predictor_run != 1 ) { | |
|       if( palette_predictor_run > 1 ) | |
|         i += palette_predictor_run − 1 | |

TABLE 1-continued

Example of advanced index map coding

| palette_coding( x0, y0, nCbS ) { | Descriptor |
|---|---|
|       PalettePredictorEntryReuseFlag[ i ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ue(v) |
|   numComps = ( ChromaArrayType = = 0 ) ? 1 : 3 | |
|   for( cIdx = 0; cIdx < numComps; cIdx++ ) | |
|     for( i = 0; i < num_signalled_palette_entries; i++ ) | |
|       palette_entry | ae(v) |
|   if( CurrentPaletteSize != 0 ) | |
|     palette_escape_val_present_flag | ae(v) |
|   if( palette_escape_val_present_flag ) { | |
|     if( cu_qp_delta_enabled_flag && !IsCuQpDeltaCoded ) { | |
|       cu_qp_delta_palette_abs | ae(v) |
|       if( cu_qp_delta_palette_abs ) | |
|         cu_qp_delta_palette_sign_flag | ae(v) |
|     } | |
|     if( cu_chroma_qp_offset_enabled_flag && !IsCuChromaQpOffsetCoded ) { | |
|       cu_chroma_qp_palette_offset_flag | ae(v) |
|       if( cu_chroma_qp_offset_flag && chroma_qp_offset_list_len_minus1 > 0 ) | |
|         cu_chroma_qp_palette_offset_idx | ae(v) |
|     } | |
|   } | |
|   if( MaxPaletteIndex > 0) { | |
|     index_part_mode | ae(v) |
|   } | |
|   if( index_part_mode = = PART_2N×2N ) { | |
|     index_map_coding( x0, y0, nCbS, nCbS ) | |
|   } | |
|   else if ( index_part_mode = = PART_2N×N ){ | |
|     index_map_coding( x0, y0, nCbS, nCbS / 2 ) | |
|     index_map_coding( x0, y0 + ( nCbs / 2 ), nCbS, nCbS / 2 ) | |
|   } | |
|   else if ( index_part_mode = = PART_N×2N ){ | |
|     index_map_coding( x0, y0, nCbS / 2, nCbS ) | |
|     index_map_coding( x0 + ( nCbs / 2 ), y0, nCbS / 2, nCbS ) | |
|   } | |
|   else { /*PART_N×N*/ | |
|     index_map_coding( x0, y0, nCbS / 2, nCbS / 2 ) | |
|     index_map_coding( x0 + ( nCbs / 2 ), y0, nCbS / 2, nCbS / 2 ) | |
|     index_map_coding( x0, y0 + ( nCbs / 2 ), nCbS / 2, nCbS / 2 ) | |
|     index_map_coding( x0 + ( nCbs / 2 ), y0 + ( nCbs / 2 ), nCbS / 2, nCbS / 2 ) | |
|   } | |
| } | |

TABLE 2

Example of advanced index map coding

| index_map_coding( x0, y0, nPbW, nPbH ) { | Descriptor |
|---|---|
|   if( MaxPaletteIndex > 0) { | |
|     palette_transpose_flag | ae(v) |
|     if( index_part_mode ! = PART_2N×2N) | |
|       index_refinement_vector | ae(v) |
|     num_palette_indices_idc | ae(v) |
|     for(i=0; i < NumPaletteIndices; i++ ) { | |
|       palette_index_idc | ae(v) |
|       PaletteIndexIdc[ i ] = palette_index_idc | |
|     } | |
|     last_palette_run_type_flag | ae(v) |
|   } | |
|   CurrNumIndices = 0 | |
|   PaletteScanPos = 0 | |
|   while( PaletteScanPos < nPbW * nPbH) { | |
|     xC = x0 + travScan[ PaletteScanPos ][ 0 ] | |
|     yC = y0 + travScan[ PaletteScanPos ][ 1 ] | |
|     if( PaletteScanPos > 0) { | |
|       xcPrev = x0 + travScan[ PaletteScanPos − 1 ][ 0 ] | |
|       ycPrev = y0 + travScan[ PaletteScanPos − 1 ][ 1 ] | |
|     } | |

TABLE 2-continued

Example of advanced index map coding

| index_map_coding( x0, y0, nPbW, nPbH ) { | Descriptor |
|---|---|
| ``` 
    PaletteRun = nCbS * nCbS - PaletteScanPos - 1
    if( MaxPaletteIndex > 0 && CurrNumIndices < NumPaletteIndices ) {
        if( PaletteScanPos >= nCbS && palette_run_type_flag[ xcPrev ][ ycPrev ]
            != COPY_ABOVE_MODE && PaletteScanPos < nPbW * nPbH - 1) {
            palette_run_type_flag[ xC ][ yC ]
        }
        readIndex = 0
        if( palette_run_type_flag[ xC ][ yC ] = = COPY_INDEX_MODE &&
            AdjustedMaxPaletteIndex > 0)
            readIndex = 1
        maxPaletteRun = nPbW * nPbH - PaletteScanPos - 1
        if( AdjustedMaxPaletteIndex > 0 &&
            ( ( CurrNumIndices + readIndex ) < NumPaletteIndices ||
            palette_run_type_flag[ xC ][ yC ] != last_palette_run_type_flag ) )
            if( maxPaletteRun > 0 ) {
                palette_run_msb_id_plus1
                if( palette_run_msb_id_plus1 > 1 )
                    palette_run_refinement_bits
            }
        CurrNumIndices + = readIndex
    }
    runPos = 0
    while ( runPos < = paletteRun ) {
        xR = x0 + travScan[ PaletteScanPos ][ 0 ]
        yR = y0 + travScan[ PaletteScanPos ][ 1 ]
        if(palette_run_type_flag[ xC ][ yC ] = = COPY_INDEX_MODE ) {
            PaletteSampleMode[ xR ][ yR ] = COPY_INDEX_MODE
            PaletteIndexMap[ xR ][ yR ] = CurrPaletteIndex
        } else {
            PaletteSampleMode[ xR ][ yR ] = COPY_ABOVE_MODE
            PaletteIndexMap[ xR ][ yR ] = PaletteIndexMap[ xR ][ yR - 1 ]
        }
        runPos++
        PaletteScanPos++
    }
}
if( palette_escape_val_present_flag ) {
    sPos = 0
    while( sPos < nPbW * nPbH ) {
        xC = x0 + travScan[ sPos ][ 0 ]
        yC = y0 + travScan[ sPos ][ 1 ]
        if( PaletteIndexMap[ xC ][ yC ] = = MaxPaletteIndex ) {
            for( cIdx = 0; cIdx < numComps; cIdx++ )
                if( cIdx = = 0 ||
                    ( xR % 2 = = 0 && yR % 2 = = 0 && ChromaArrayType = = 1 ) ||
                    ( xR % 2 = = 0 && ChromaArrayType = = 2 ) ||
                    ChromaArrayType = = 3 ) {
                    palette_escape_val
                    PaletteEscapeVal[ cIdx ][ xC ][yC ] = palette_escape_val
                }
        }
        sPos++
    }
}
}
``` | ae(v)<br><br><br><br><br><br><br><br>ae(v)<br><br>ae(v)<br><br><br><br><br><br><br><br><br><br><br><br><br><br><br><br><br><br><br><br><br><br><br><br><br><br><br><br><br><br>ae(v) |

As discussed above with regard to FIG. 1, strings within a block are coded, for example, one after another until the last string (e.g., the last row in the block of FIG. 1) is reached. In the current HEVC SCC draft, the last string in the block is treated differently from the other strings. To signal this difference, a last_palette_run_type_flag is used for the last string while a palette_run_type_flag is used for the other strings, and different context models are used for these two flags. However, it has been discovered that using two different context models to encode these two flags provide little, if any, coding benefit. Therefore, the context models for the palette_run_type_flag and last_palette_run_type_flag are unified. In an embodiment, the context model for palette_run_type_flag is used for each string in the block, inclusive of the last string. In other words, the context model corresponding to the palette_run_type_flag is used for the last string in the block.

The inventive concepts discussed herein on advanced index map coding may be implemented in a module and/or system found in FIGS. 7 and 8, as will be more fully explained below. The operation of a transmitter 700 as shown in FIG. 7 and a receiver 800 as shown in FIG. 8 will be explained further in the following paragraphs.

Figure 7:
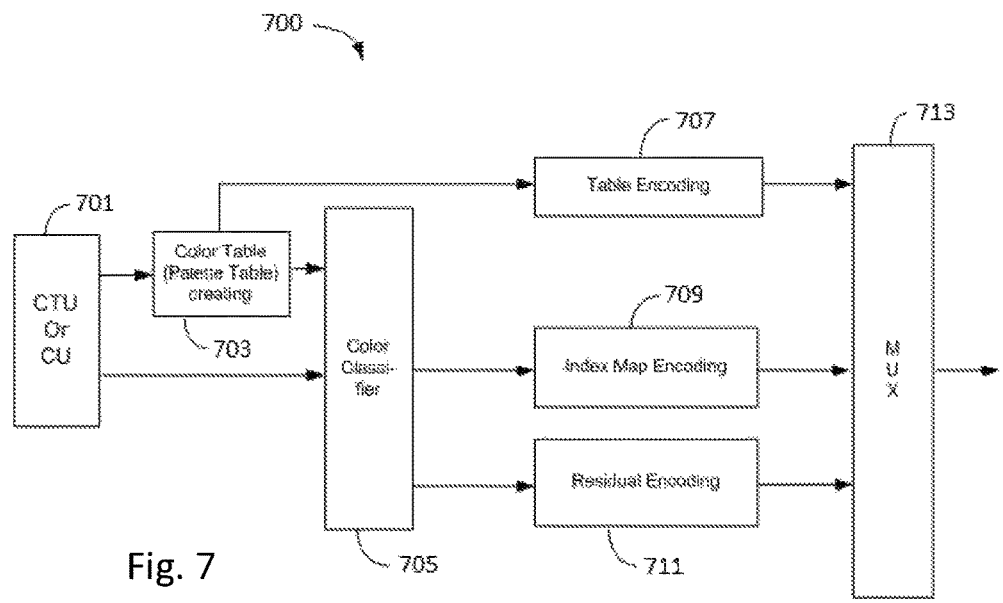
FIG. 7 is an embodiment of a transmitter (e.g., encoder).
Figure 8:
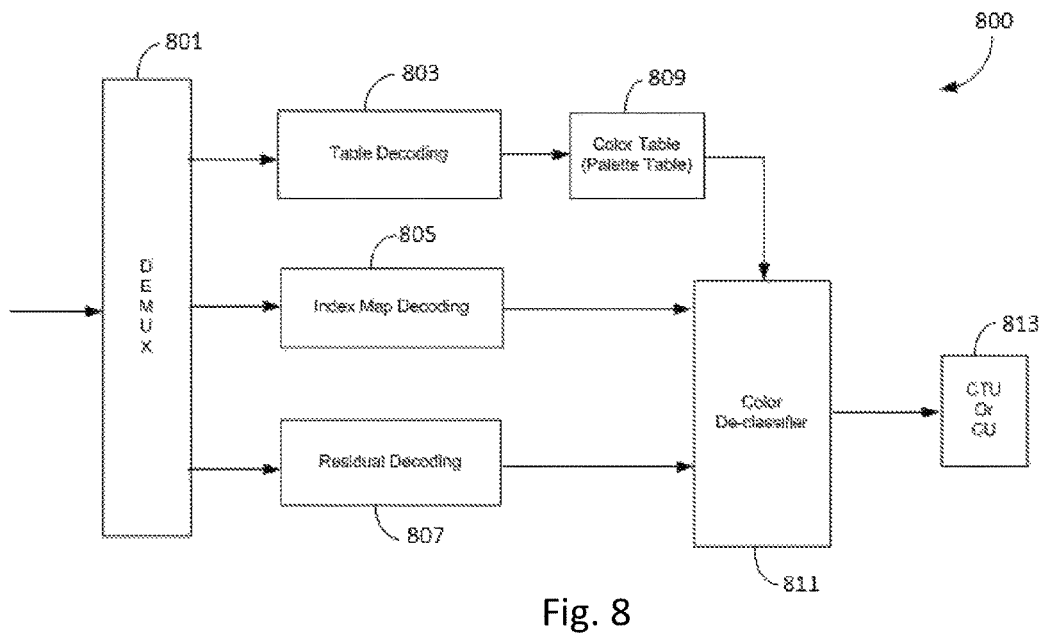
FIG. 8 is an embodiment of a receiver (e.g., decoder).

FIG. 7 illustrates a functional block diagram of an example transmitter 700 that performs a screen content coding process according to this disclosure. FIG. 8 illustrates a functional block diagram of an example receiver 800 that performs a screen content decoding process according to this disclosure. The embodiments of the transmitter 700 and the receiver 800 are for illustration only. Other embodiments of the transmitter 700 and the receiver 800 could be used without departing from the scope of this disclosure.

The transmitter 700 is configured to perform a high-efficiency color palette compression (CPC) process that can be performed on each CU or coding tree unit (CTU) in a bitstream. As shown in FIG. 7, the transmitter 700 starts with a CU 701 in a bitstream. As noted above, a CU is a basic operating unit in HEVC and HEVC Format Range Extension (RExt), and is generally a square block of pixels that includes three color components (e.g., RGB, YUV, XYZ, etc.).

For ease of explanation, the transmitter 700 of FIG. 7 will be described with a CU 701. However, in an embodiment, the transmitter 700 of FIG. 7 may start with a CTU 701 instead of a CU 701. Those of skill in the art will understand that the transmitter 700 can perform substantially the same process with a CTU 701.

A palette table creating block 703 uses the CU 701 to derive or generate a palette table (sometimes referred to as a color table). To derive the palette table, the palette table creating block 703 of FIG. 7 orders the color values according to one or more ordering rules. The palette table can be ordered according to an occurrence frequency of each color value, the actual color intensity of each pixel of the CU 701, or any other suitable ordering metric or metrics, to increase the efficiency of the following encoding operations.

Based on the derived palette table creating block 703, a color classifier block 705 uses the CU 701 to assign the colors or pixel values of the CU 701 into a color index map. A table encoding block 707 receives the palette table and encodes the entries in the palette table. An index map encoding block 709, which includes the module that may be used to implement the inventive concepts herein, encodes the color index map created by the color classifier block 705. These operations are described in greater detail below.

A residual encoding block 711 encodes each escape color created by the color classifier block 705. In an embodiment, the residual encoding block 711 performs adaptive fixed-length or variable-length residual binarization. Then, a multiplexing (MUX) block 713 generates the compressed bitstream using the encoded residuals.

As shown in FIG. 8, the receiver 800 is configured to perform a screen content decoding process analogous to the screen content encoding process performed by the transmitter 700 of FIG. 7, as described above. The receiver 800 receives the compressed video bitstream and then, using the de-multiplexer 801, parses the bitstream into an encoded palette table, color index map, and encoded residuals. The table decoding block 803 and palette table creating block 809 perform processes opposite from the table encoding block 707 and the palette table creating block 703 of FIG. 7 to reconstruct, for each CU, a complete palette table. Similarly, the index map decoding block 805, which includes the module that may be used to implement the inventive concepts herein, and residual decoding block 807 perform processes opposite from the index map encoding block 709 and the residual encoding block 711 to reconstruct the color index map. The color de-classifier block 811 derives the pixel value at each position by combing the color index map and palette table, thereby reconstructing a CTU or CU 813.

Although FIGS. 7 and 8 illustrate examples of a transmitter 700 and a receiver 800 for performing screen content encoding and decoding, various changes may be made to FIGS. 7 and 8. For example, various components in FIGS. 7 and 8 could be combined, further subdivided, or omitted and additional components could be added according to particular needs. As a particular example, various components could be arranged together in one housing or on one circuit board, or be performed by a single processor or processing unit.

Figure 9:
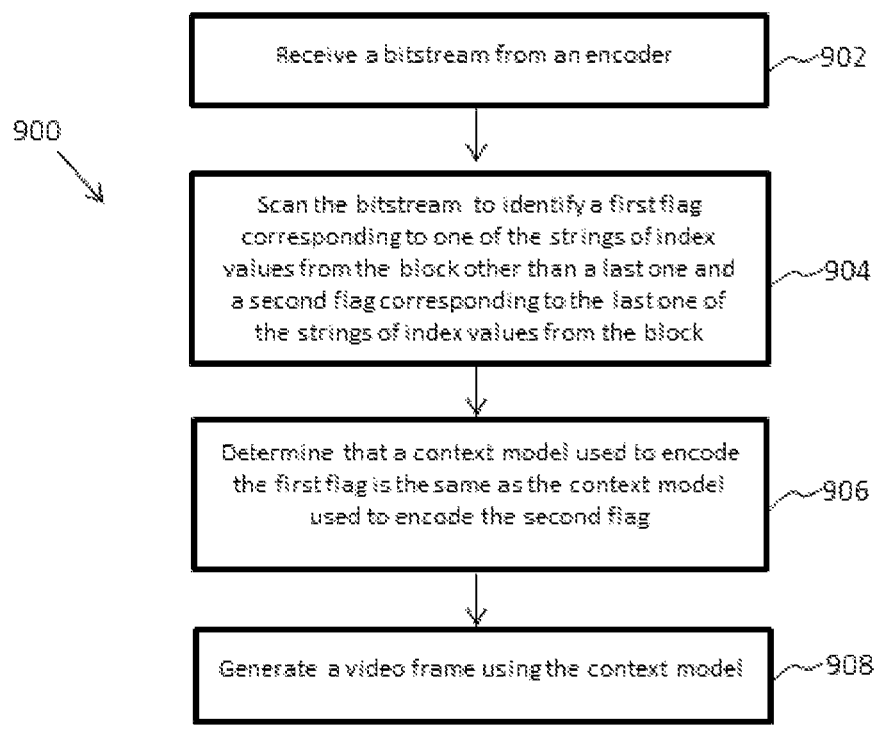
FIG. 9 is a flowchart of an embodiment of a method of coding.
Figure 10:
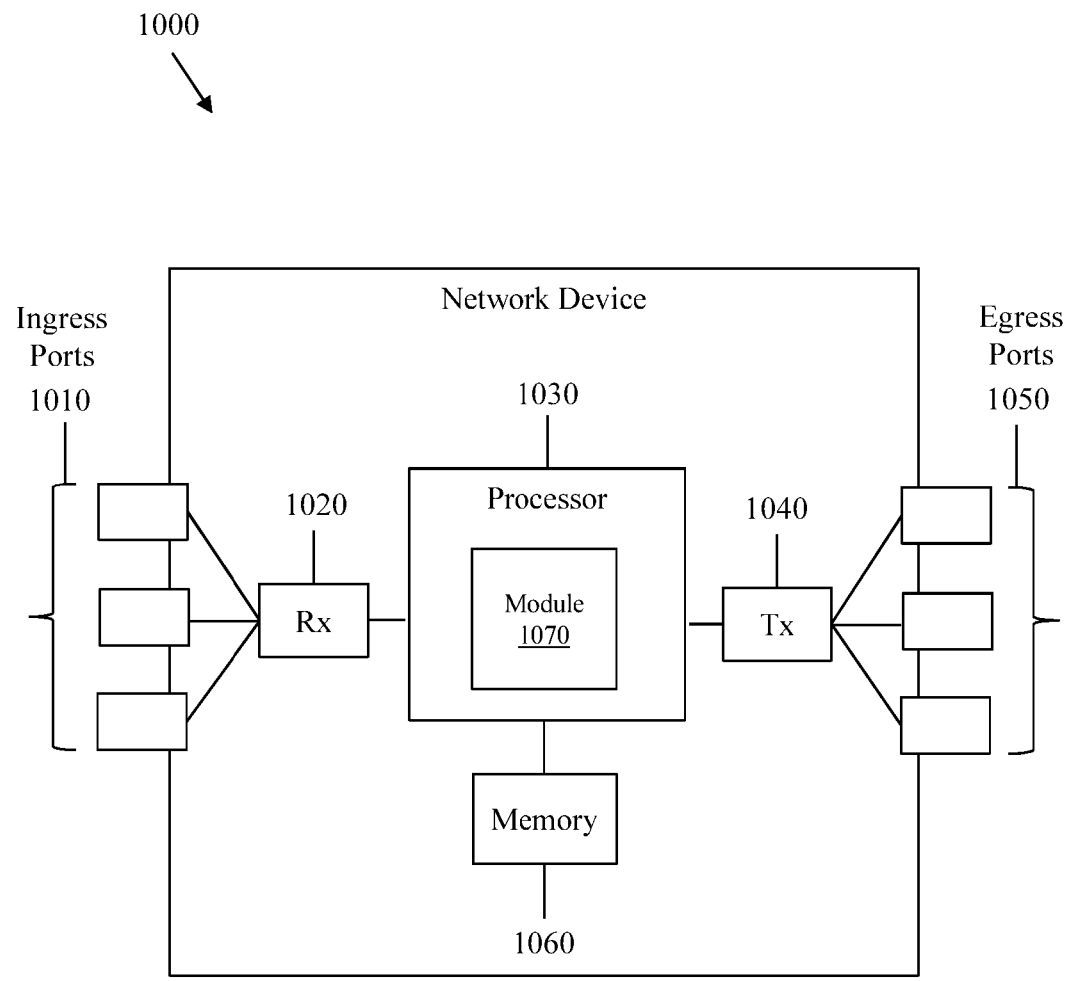
FIG. 10 is a schematic diagram of an embodiment of a network unit that may comprise an encoder and decoder.

FIG. 9 is a flowchart of a method of decoding 900 according to an embodiment of the disclosure. The method 900 may be performed by, for example, a module within the index map decoding block 805 of FIG. 8. The method 1000 may be performed when, for example, a bitstream received from an encoder is decoded. In step 902, a bitstream from an encoder is received by a decoder. In step 904, the bitstream is scanned to identify a first flag (e.g., a palette_run_type_flag) corresponding to one of the initial strings of index values from the block and a second string (e.g., a last_palette_run_type_flag) corresponding to the last string in the block. In step 906, the decoder determines that a context model used to encode the first flag is the same as the context model used to encode the second flag. In other words, the decoder recognizes that the context models match. In step 908, the decoder generates a video frame using the context model. The video frame may eventually be displayed on a computing device (e.g., computer, smart phone, tablet device, etc.) for a user.

In addition to the above, an improved motion vector (MV)/block vector (BV) prediction candidate selection and PU partition technique are disclosed. In the existing specification of HEVC, Advanced Motion Vector Prediction (AMVP) candidates are selected from neighbor PUs, and only MVs of Inter PUs are used to form the AMVP list. Upon the adoption of unification of Intra Block Copy (IBC) and inter frame coding, the neighboring PUs identified in the AMVP candidate selection process may be coded in the IBC mode. As a result, the AMVP list for inter frame coded PU may consist of BVs from IBC coded PUs. Similarly, the Advanced Block Vector Prediction (ABVP) list may include MVs from Inter-coded PUs.

Due to the difference between statistical distribution of IBC BV and Inter MV, mixing BV and MV together in either AMVP or ABVP candidate list may not lead to an optimum prediction for coding of a block vector for IBC or coding of a motion vector for inter-coded PUs. Therefore, the following methods have been developed to address the above problems.

In one embodiment method, when forming the AMVP list for the Inter PU, the BV and/or its scaling version are eliminated as an AMVP candidate when the PU at the pre-defined PU location is an IBC PU. As a result, other MV candidates down in the AMVP list may be selected. In other words, use MVs only in the AMVP process and mark MVs unavailable for those IBC coded neighboring PUs. Likewise, when forming the ABVP list for the IBC PU, the MV and/or its scaling version are eliminated as an ABVP candidate when the PU in the pre-defined PU location is an Inter PU. As a result, other BV candidates down in the ABVP list may be selected. In other words, use BVs only in the ABVP process and mark BVs unavailable for those inter coded neighboring PUs.

In one embodiment method, when forming the AMVP list for the Inter PU, more (Spatial and/or Temporal) PU locations are added when the PU at the pre-defined PU location is an IBC PU so that there are enough MV candidates for AMVP candidate selection. Likewise, when forming the ABVP list for IBC PU, more (Spatial) PU locations are added when the PU in pre-defined PU location is an Inter PU so that there are enough BV candidates for ABVP candidate selection. In other words, additional candidates are added to the particular candidate list to ensure that the candidate list is full. Indeed, a vector of the wrong type is present, that vector is removed from the candidate list and a substitute vector of the correct type is substituted into the list so that each of the vectors in the list is the same type of vector.

In one embodiment method, when forming the AMVP list for the Inter PU, the number of candidates and the order of selection in the AMVP candidate selection process are changed when more (Spatial and/or Temporal) PU locations are included in the AMVP candidate selection. Likewise, when forming the ABVP list for the IBC PU, the number of candidates and the order of selection in ABVP candidate selection process are changed when more (Spatial) PU locations are included in the ABVP candidate selection.

FIG. 11 is a schematic diagram of a network device 1100 according to an embodiment of the disclosure. The device 1100 is suitable for implementing the disclosed embodiments as described below. The device 1100 comprises ingress ports 1110 and receiver units (Rx) 1120 for receiving data; a processor, logic unit, or central processing unit (CPU) 1130 to process the data; transmitter units (Tx) 1140 and egress ports 1150 for transmitting the data; and a memory 1160 for storing the data. The device 1100 may also comprise optical-to-electrical (OE) components and electrical-to-optical (EO) components coupled to the ingress ports 1110, the receiver units 1120, the transmitter units 1140, and the egress ports 1150 for egress or ingress of optical or electrical signals.

The processor 1130 is implemented by hardware and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with the ingress ports 1110, receiver units 1120, transmitter units 1140, egress ports 1150, and memory 1160. The processor 1130 comprises a module 1170. The module 1170 implements the disclosed embodiments described above. The inclusion of the module 1170 therefore provides a substantial improvement to the functionality of the device 1100 and effects a transformation of the device 1100 to a different state. Alternatively, the module 1170 is implemented as instructions stored in the memory 1160 and executed by the processor 1130.

The memory 1160 comprises one or more disks, tape drives, and solid-state drives and may be used as an overflow data storage device, to store programs when such programs are selected for execution, and to store instructions and data that are read during program execution. The memory 1160 may be volatile and non-volatile and may be read-only memory (ROM), random-access memory (RAM), ternary content-addressable memory (TCAM), and static random-access memory (SRAM).

A method of decoding includes means for receiving a bitstream from an encoder, means for parsing a first flag from the bitstream, wherein the first flag corresponds to a last string of index values in a block, means for parsing a second flag from the bitstream, wherein the second flag corresponds to a string of values in the block other than the last string of index values in the block, wherein a context model used to parse the first flag is the same as the context model used to parse the second flag, and means for generating the video frame using the first flag and the second flag.

A decoding apparatus including means for receiving a bitstream from an encoder, the bitstream containing an index map, means for decoding the index map, wherein the index map includes a partition depth indicating a total number of partitions within the index map and a single index flag indicating a number of indexes for each sub-block within the index map, and means for transmitting a video frame constructed using the partition depth and the single index flag.

A decoding apparatus including means for receiving a bitstream from an encoder, the bitstream containing a vector prediction candidate list for a prediction unit of a first type, wherein vector candidates within the vector prediction candidate list are of a first type even though a neighbor prediction unit is of a second type, means for selecting one of the vector candidates of the first type from the vector prediction candidate list, and means for transmitting a video frame constructed using the one of the vector candidates selected from the vector prediction candidate list.

The terms network "element," "node," "component," "module," and/or similar terms may be interchangeably used to generally describe a network device and do not have a particular or special meaning unless otherwise specifically stated and/or claimed within the disclosure.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of decoding a video frame, comprising:
   receiving, by a decoder, a bitstream from an encoder;
   parsing, using the decoder, a first flag from the bitstream, wherein the first flag corresponds to a last string of index values in a block;
   parsing, using the decoder, a second flag from the bitstream, wherein the second flag corresponds to a string of values in the block other than the last string of index values in the block, wherein a context model used to parse the first flag is the same as the context model used to parse the second flag; and
   generating, by the decoder, the video frame using the first flag and the second flag.

2. The method of claim 1, wherein the first flag comprises a last_palette_run_type_flag.

3. The method of claim 1, wherein the second flag comprises a palette_run_type_flag.

4. The method of claim 1, wherein the context model comprises a context adaptive binary arithmetic coding (CABAC) context model.

5. The method of claim 1, wherein the second flag comprises a palette_run_type_flag and the first flag comprises a last_palette_run_type_flag, and wherein the context model comprises a context adaptive binary arithmetic coding (CABAC) context model.

6. A decoding apparatus, comprising:
   a receiver configured to receive a bitstream from an encoder, the bitstream containing an index map;
   a processor operably coupled to the receiver and configured to decode the index map, wherein the index map includes a partition depth indicating a largest number of partitions within the index map and a single index flag indicating a depth for each sub-block within the index map; and a transmitter operably coupled to the processor and configured to transmit a video frame constructed using the partition depth and the single index flag.

7. The decoding apparatus of claim 6, wherein the index map comprises a square index map and the partitions comprise a quad-tree structure of square sub-blocks.

8. The decoding apparatus of claim 6, wherein the index map comprises a square index map and the partitions comprise rectangular partitions.

9. The decoding apparatus of claim 6, wherein the partition depth is not equal to zero when the single index flag is included in the bitstream.

10. The decoding apparatus of claim 6, wherein a single color table is shared among all of the sub-blocks.

11. The decoding apparatus of claim 6, wherein a scanning direction for at least one of the sub-blocks is different from the scanning direction for another of the sub-blocks.

12. A decoding apparatus, comprising:
  a receiver configured to receive a bitstream from an encoder, the bitstream containing a vector prediction candidate list for a prediction unit of a first type, wherein vector candidates within the vector prediction candidate list are of a first type even though a neighbor prediction unit is of a second type, and wherein the vector prediction candidate list includes at least one vector candidate of the first type that replaced at least one vector candidate of the second type;
  a processor operably coupled to the receiver and configured to select one of the vector candidates of the first type from the vector prediction candidate list; and
  a transmitter operably coupled to the processor and configured to transmit a video frame constructed using the one of the vector candidates selected from the vector prediction candidate list.

13. The decoding apparatus of claim 12, wherein the first type is an Intra Block Copy (IBC) and the second type is inter frame coding.

14. The decoding apparatus of claim 12, wherein the first type is inter frame coding and the second type is an Intra Block Copy (IBC).

15. The decoding apparatus of claim 12, wherein the vector prediction candidate list comprises an Advanced Motion Vector Prediction (AMVP) list.

16. The decoding apparatus of claim 12, wherein the vector prediction candidate list comprises an Advanced Block Vector Prediction (ABVP) list.

17. The decoding apparatus of claim 12, wherein an order of the vector candidates of the first type in the vector prediction list has been changed in response to at least one of the vector candidates of the second type being eliminated.

18. The decoding apparatus of claim 12, wherein a total number of the vector candidates of the first type in the vector prediction list has been changed when at least one of the vector candidates of the second type has been eliminated.

* * * * *